Figure 1:
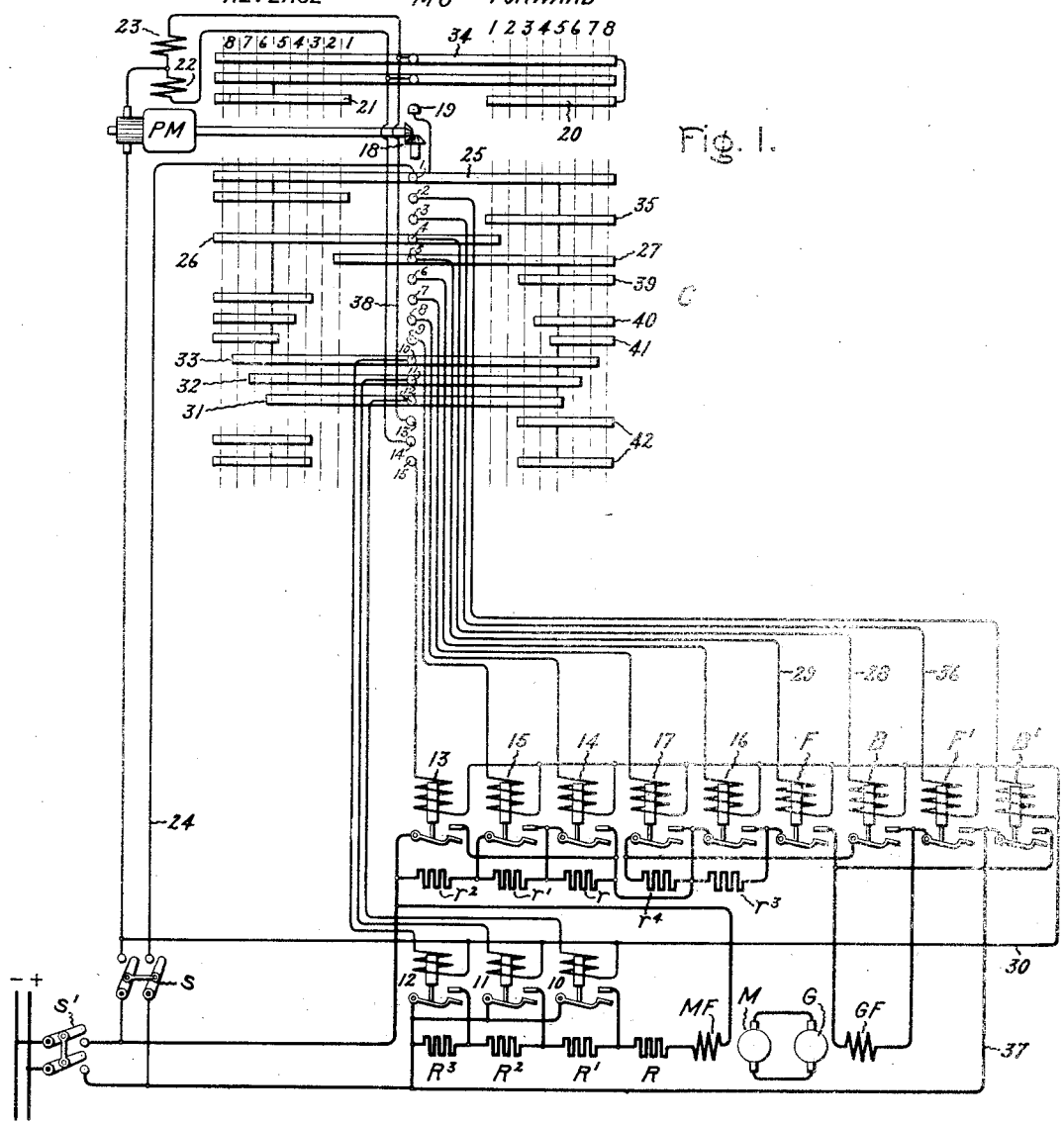

C. L. PERRY.
CONTROLLER FOR ELECTRIC MOTORS.
APPLICATION FILED DEC. 6, 1918.

1,350,937.

Patented Aug. 24, 1920.

Inventor:
Charles L. Perry,
by
His Attorney

UNITED STATES PATENT OFFICE.

CHARLES L. PERRY, OF SCHENECTADY, NEW YORK, ASSIGNOR TO GENERAL ELECTRIC COMPANY, A CORPORATION OF NEW YORK.

CONTROLLER FOR ELECTRIC MOTORS.

1,350,937. Specification of Letters Patent. Patented Aug. 24, 1920.

Application filed December 6, 1918. Serial No. 265,628.

*To all whom it may concern:*

Be it known that I, CHARLES L. PERRY, a citizen of the United States, residing at Schenectady, in the county of Schenectady, State of New York, have invented certain new and useful Improvements in Controllers for Electric Motors, of which the following is a specification.

My invention relates to the control of electric motors and has for its object the provision of improved means whereby an electric motor may be started, stopped and generally controlled in a reliable, simple and efficient manner.

My invention relates more specifically to the control of electric motors which drive their loads at various definite speeds as, for instance, motors for driving reversing rolls for steel mills. In this kind of service the operation of the motor controller by a pilot motor has certain advantages. This method of control provides a definite speed of automatic operation for the motor controller but as heretofore employed the operation has not been entirely within the control of the operator. The complete control by the operator at all times is highly desirable, especially where the controller affects a considerable range of speed. Where, for instance, Ward Leonard control is employed for the motor, a large number of definite speed points is readily obtainable, and my improved control is particularly well adapted to such a system.

In carrying out my invention, I provide an improved arrangement comprising a motor controller, which has a plurality of positions corresponding with certain definite speeds of the motor, with a pilot motor for operating it in either direction. I also provide a manually operated master controller having positions corresponding with those of the main controller. The arrangement is such that when the master controller is moved in either direction so that its position no longer corresponds with that of the main controller, the pilot motor moves the main controller until the positions do correspond. If, therefore, the operator desires a certain speed, he moves the master controller to a position corresponding to that speed, and the pilot motor will thereupon automatically move the main controller to a corresponding position which gives the proper speed.

Another feature of my improved system which is of great advantage, especially with the Ward Leonard method of control, is the provision of means whereby the movement of the master controller may perform an operation which will be effective only temporarily. In the case of the Ward Leonard control, for example, the movement may strengthen the field of the generator temporarily beyond that corresponding to the speed required so as to force the field to build up quickly to the proper strength. This forcing connection is automatically broken as the main controller is moved by the pilot motor to its initial relation with the master controller. Other features of novelty and purposes of my invention will appear in the course of the following specification in which I have shown my invention embodied in concrete form for purposes of illustration.

Figure 2:
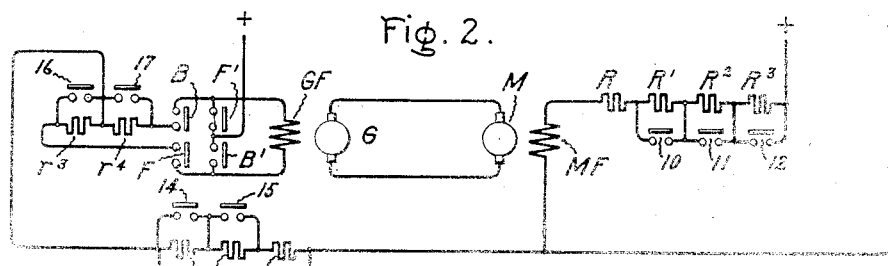

In the accompanying drawing illustrating one embodiment of my invention, Figure 1 is a diagrammatic view of a complete system, and Fig. 2 is a simplified view illustrating the main circuits.

Referring to the drawing, it will be seen that I have illustrated my invention applied to a Ward Leonard system of control. The armature of the generator is indicated at G, and GF indicates the generator field. The working motor M is connected with the generator armature in the usual way, the field of the motor MF being separately excited from the same source of supply as the generator field.

Referring first to Fig. 2, it will be noted that the motor field is provided with resistance sections $R'$, $R^2$ and $R^3$, in series with it, the last three of these sections being short circuited by switches 10, 11 and 12, respectively. The generator field GF is likewise provided with series resistances $r$, $r'$ and $r^2$, which are short circuited by switches 13, 14 and 15. Switch 13 short circuits all three sections of resistance for a purpose hereinafter set forth, whereas switches 14 and 15 each short circuits a section of resistance. $r^3$ and $r^4$ indicate two resistance sections which are arranged to be connected either in parallel with the generator field, or in series therewith, as hereinafter pointed out. These resistances are short circuited by switches 16 and 17. Switches F and F' complete the generator field circuit so that the energizing current through the field will flow in one direction while switches B and B' complete the circuit through the field of the generator so that the current will flow in the reverse direction. When the switches F and F' are closed, therefore, the motor will be operated in a forward direction, and when the switches B and B' are closed the motor will operate in the reverse direction. As will be seen from an inspection of Fig. 1, all of the switches thus far referred to are electromagnetic switches or contactors. It will also be noted that electromagnetic switches F and B are closed in the "off" position of the controller, thereby placing the two resistances $r^3$ and $r^4$ in parallel with the generator field. To obtain a forward direction of rotation of the motor, therefore, electromagnetic switch F' is closed, thereby completing the circuit from the positive side of the line through switch F', field winding GF, switch F, resistance $r^3$, and resistances $r, r'$ and $r^2$, to the negative side of the line. The closing of switch F' likewise completes a circuit from the positive side of the line through the switch F', through the switch B and resistance $r^4$, to the negative side of the line. The closing of switch F' therefore places the resistance $r^4$ in parallel with the generator field GF. In like manner for the reverse direction of rotation of the motor, the switch B' is closed, thereby connecting the resistance $r^3$ in parallel with the generator field.

By referring to Fig. 1, it will also be noted that the electromagnetic switch 13 is closed in the third position of the controller, thereby short circuiting resistance sections $r, r'$ and $r^2$. As hereinafter pointed out, this switch 13 is only closed temporarily and has the function of forcing the field of the generator so as to cause it to build up quickly. Sections $r$ and $r'$ are, however, subsequently short circuited, individually, to produce a field strength corresponding to the speed of the motor desired.

Referring now to Fig. 1, C represents the main or motor controller for bringing about the proper sequence of operations of switches above referred to. This controller is driven by a pilot motor PM, through the gears 18. As shown, the motor controller is positively geared to the pilot motor so that when the latter operates in either direction the controller will be operated. Above the controller C, and having no mechanical driving connection therewith, is the master controller MC, having operative positions corresponding with those of the main controller. There are two electrical connections, however, between the master controller and the main controller. These connections control the operation of the pilot motor and also the operation of the forcing contactor 13. A contact 19 is driven by the main controller and makes contact with segments 20 and 21 of the master controller. Whenever, the two controllers are not in corresponding positions, that is, as shown in Fig. 1, for instance, if the master controller is thrown to the right, contact 19 will engage with segment 21 and energize field 22 of the pilot motor, so as to cause the pilot motor to operate in one direction, whereas if the master controller is thrown to the left the field winding 23 of the pilot motor will be energized and cause the pilot motor to operate in the opposite direction. Assuming that the master controller is moved to the right, to the position 4, for instance, the pilot motor will be energized so as to cause the main controller C to move to the right, thereby moving the contact 19 along the segment 21 to the right until the main controller reaches the fourth position whereupon the contact will leave the segment and stop the pilot motor. In like manner, if the master controller is thrown to the left the main controller will be moved to the left by the pilot motor so as to stop the pilot motor when the main controller reaches a position corresponding to that of the master controller.

As thus constructed and arranged, the operation of my control system will be as follows: Assuming the switches $s$ and $s'$ to be closed and the controllers in the position shown in Fig. 1, it will be noted that the contactors F and B are closed in the "off" position of the controllers, the circuit being from the positive side of the line through the switch $s$, wire 24, through the segment 25, thence through the segments 26 and 27 in parallel and through the wires 28 and 29, respectively, through windings of the contactors F and B, and thence to the negative side of the line through wire 30. It will also be noted that the contactors 10, 11 and 12 are closed through the segments 31, 32 and 33, respectively, thereby short circuiting the resistance sections R', R² and R³, in series with the motor field. The field of the generator is not energized, however, so that the motor is stationary in this position. Assuming now that it is desired to operate the motor in the forward direction at full speed corresponding with position 8 on the controller, the master controller will be turned to the left so that the segment 20 will engage the contact 19 in the 8th position. The immediate result will be that the pilot motor will operate in a direction to cause the main controller to turn in the same direction as the master controller, namely, to the left, the circuit of the pilot motor being from the positive side of the line, through the wire 24 to segment 25, contact 19, segments 20 and 34, through the field winding 23 and armature, and back to the negative side of the line. The main controller now operating in its first position will energize the contactor F', thereby closing the circuit of the generator field so as to cause the motor to operate in a forward direction. The circuit of this contactor is from the positive side of the line through wire 24, segments 25 and 35, wire 36 and back to the negative side of the line through wire 30. Three contactors will now be closed, namely, contactors F, F' and B. The circuit of the generator field is now complete from the positive side of the line, through wire 37, contactor F', generator field GF, contactor F, resistance $r^3$, resistances $r$, $r'$ and $r^2$ to the negative side of the line. There is also a circuit in parallel with the generator field through resistance $r^4$, from contactor F', through contactor B, through resistance $r^4$, and thence through resistances $r$ $r'$ and $r^2$ to the negative side of the line. In its first position, therefore, resistance $r^4$ is in parallel with the generator field thereby weakening the field of the generator and producing a relatively low potential so as to give a low speed to the motor. When the main controller reaches the second position, contactor B opens by reason of the opening of the circuit of its winding at segment 26. This opens the short circuit through the resistance $r^4$ around the generator field and thereby strengthens the field of the generator and causes the motor to speed up.

When the main controller reaches the third position contactor 13 is closed by the energizing of its winding through segments 42, the circuit being from the positive side of the line through wire 24, segment 25, contact 19, segments 20 and 34, wire 38, segments 42 to the winding of contactor 13, and back to line through wire 30. The closing of this contactor, it will be seen, short circuits resistance sections $r$, $r'$ and $r^2$, thereby tending to strengthen the field of the generator beyond the point which corresponds with the speed of the motor at that position. It will be understood, of course, that the field of the generator builds up slowly and that the purpose of this forcing contactor is to cause the generator field to build up more rapidly by energizing it in excess of the requirements at that point. It will be noted, however, that contactor 13 is only closed temporarily since its circuit will be opened when the main controller reaches its final position due to the fact that the contact 19 will leave the segment 20. At the third position of the master controller, contactor 16 is also closed through segment 39, thereby short circuiting the resistance $r^3$ in series with the generator field, and further increasing the speed of the motor. When the main controller reaches the 4th position, contactor 14 will be energized at segment 40, thereby closing a short circuit around the resistance section $r$. This section of resistance is already short circuited by the contactor 13 so that there is no immediate effect. This is also true of contactor 15 which is closed in the 5th position of the controller through segment 41. In the 6th position of the controller, contactor 10 is opened by reason of the deënergization of its winding at segment 31. This has the effect of inserting resistance R' in the field circuit of the motor, thereby causing the motor to speed up. In the 7th and 8th positions, respectively, the contactors 11 and 12 are opened at the segments 32 and 33, thereby inserting resistances $R^2$ and $R^3$ in the field circuit of the motor and further speeding up the same. In the meantime the contact 19 has been moving to the left along with the segment 20, and when the 8th position is reached, and the positions of the two controllers correspond, the contact 19 moves off of segment 20 and stops the pilot motor. At the same time the forcing contactor 13 opens without affecting the remaining contactors. The motor will now run at the speed corresponding to position 8.

A similar sequence of operations will take place when the controller is moved to any intermediate position, that is, the main controller will follow the movements of the master controller to the intermediate position, the forcing contactor acting the same way as above described. Likewise, if the master controller is thrown in the reverse, the main controller will follow and a similar sequence of operation occurs.

It will be seen that I have provided a simple and effective automatic control system which, however, is at all times under the control of the operator. While I have described my invention as embodied in concrete form and as operating in a specific manner in accordance with the provisions of the patent statutes, it should be understood that my invention is not limited thereto as various modifications thereof will suggest themselves to those skilled in the art without departing from the spirit of my invention the scope of which is set forth in the annexed claims.

What I claim as new and desire to secure by Letters Patent of the United States, is:—

1. The combination with an electric motor, of a main controller therefor having a plurality of positions, a pilot motor for operating the same, a manually operated master controller having positions corresponding with those of the main controller, and means comprising a single movable contact establishing an electrical connection for the pilot motor through the main and master controllers, whereby when the master controller is moved to a predetermined position the main controller is moved by the pilot motor to a corresponding position.

2. The combination with an electric motor, of a main controller therefor having a plurality of controlling positions, a master controller having corresponding positions, a pilot motor for operating the main controller, and means comprising a single movable contact establishing an electrical connection for the pilot motor through the main and master controllers, whereby when the two controllers are out of corresponding positions the main controller is moved by the pilot motor in a direction to stop the movement of the controller by the pilot motor when the positions correspond.

3. The combination with an electric motor, of a main controller therefor having a plurality of controlling positions, a pilot motor for operating the main controller, a master controller having a contact member movable with respect to a contact member associated with the main controller to complete a circuit through the main controller to cause the pilot motor to drive the main controller to any predetermined position, and connections whereby the movement of the pilot motor moves the contact member associated with the main controller to stop the movement of the main controller by the pilot motor.

4. The combination with an electric motor, of a main controller therefor, a master controller, a contact movable with the main controller and arranged to be engaged by the master controller to complete a circuit to cause the pilot motor to drive the main controller, and connections whereby movement of the pilot motor moves the main controller until the contact moves out of engagement with the master controller and stops the main controller.

5. The combination with an electric motor, of a main controller therefor having a plurality of operative positions, a master controller having corresponding positions, a pilot motor for driving the main controller, a contact on the main controller engaging a contact on the master controller when the latter is moved to an operative position to cause the pilot motor to drive the main controller in a direction to move its contact out of engaging relation.

6. The combination with an electric motor, of a main controller therefor having a plurality of operative positions, a contact on the main controller coöperating with the master controller and normally out of engaging relation therewith, connections whereby when the master controller is moved in one direction to an operative position into engagement with said contact, the pilot motor drives the contact in the same direction until the normal non-engaging relation is established.

7. The combination with a dynamo electric machine, of a main controller therefor having a plurality of positions, a pilot motor for operating the same, a master controller, a single contact member movable with one of the controllers for establishing electrical connections for the pilot motor through a contact member movable with the other controller, whereby movement of the master controller to a predetermined position causes the pilot motor to be energized to move the main controller to a corresponding position.

8. The combination with a dynamo electric machine of a main controller therefor having a plurality of positions, a pilot motor for operating the same, a master controller having a plurality of operative positions, means whereby movement of the master controller causes a corresponding movement of the main controller and temporarily acts upon the dynamo electric machine while the controllers are out of corresponding positions, the action being interrupted by the subsequent movement of the main controller to its initial relation with the master controller.

9. The combination with an electric motor of a generator supplying energy thereto, a main controller for varying the field strength of the generator, a pilot motor for operating the main controller, a master controller, and means whereby the movement of the master controller causes a subsequent corresponding movement of the main controller and temporarily acts to strengthen the field of the generator while the controllers are out of corresponding positions, the action being interrupted by the resulting movement of the main controller to its initial relation with the master controller.

10. The combination with an electric motor of a generator supplying energy thereto, a resistance for the generator field, a main controller for varying the said resistance, a pilot motor for operating the main controller, a master controller, and means whereby movement of the master controller causes a subsequent corresponding movement of the main controller and temporarily acts to cut the resistance out of the field of the generator while the controllers are out of corresponding positions, the action being interrupted by the resulting movement of the main controller to its initial relation with the master controller.

11. The combination with an electric motor of a generator supplying energy thereto, a main controller for varying the field strength of the generator, a pilot motor for operating the main controller, a master controller, and means comprising a movable contact associated with one of the controllers for energizing the pilot motor and for controlling the field strength of the generator, whereby when the two controllers are out of corresponding positions the main controller is moved by the pilot motor in a direction to stop the movement of the controller by the pilot motor when the positions correspond and the field strength of the generator is temporarily increased until the main controller is returned to its initial relation with the master controller.

In witness whereof, I have hereunto set my hand this 5th day of December, 1918.

CHARLES L. PERRY.